Dec. 7, 1937.  K. HUBER  2,101,710
APPARATUS FOR MEASURING THE REGION OF DENSITY OF A NEGATIVE
Filed March 16, 1935
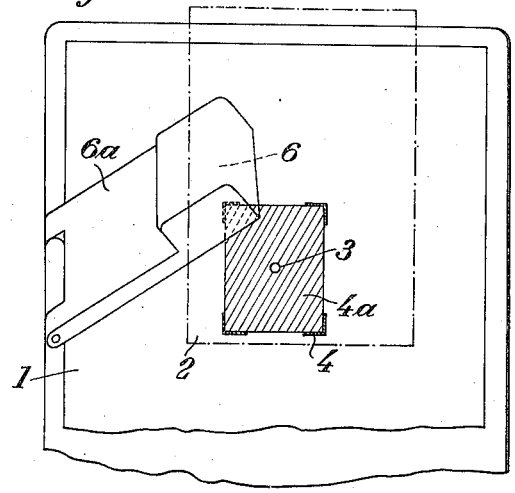
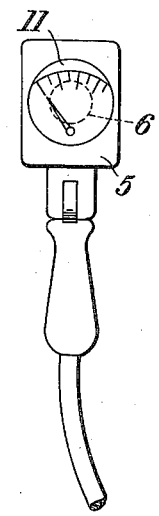
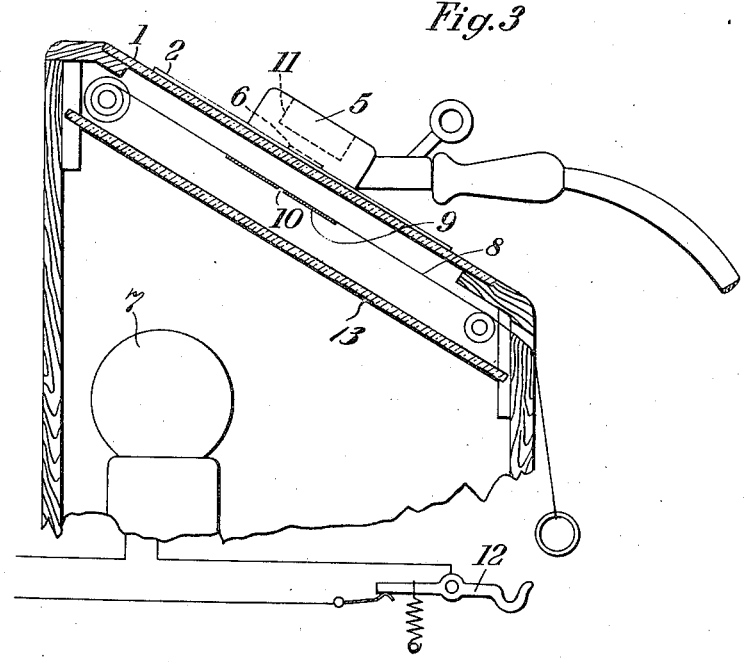
Karl Huber  Inventor
By  Attorney Patented Dec. 7, 1937

2,101,710

UNITED STATES PATENT OFFICE 2,101,710

APPARATUS FOR MEASURING THE REGION OF DENSITY OF A NEGATIVE

Karl Huber, Munich, Germany, assignor to Agfa Ansco Corporation, Binghamton, N. Y., a corporation of New York Application March 16, 1935, Serial No. 11,407
In Germany March 17, 1934

3 Claims. (Cl. 88—14).

This present invention relates to an apparatus for measuring the region of density of a negative.

One of its objects is an improved device in apparatus for measuring the region of density of negatives and thereby the period of illumination necessary for printing. Further objects will be seen from the detailed specification following hereafter. Reference being made to the accompanying drawing in which:

Fig. 1 is a plan of the measuring position, the contact surface being indicated by marking-corners and also by a red field with a white measuring point, Fig. 2 represents a detailed view of the removable photo-electric cell, and Fig. 3 represents in section a side view of a printing apparatus, a curtain with a red disc and a measuring opening being provided between the source of light and the negative.

With apparatus for measuring the region of density of a negative and the period of illumination necessary for printing by means of a photo-electric cell, it is difficult to bring the opaque photo-electric cell exactly over the lightest or darkest pictorially important point of the negative, which is generally a very small point, and is illuminated from below. The accuracy of the measurement depends, however, to a very great extent on the adjustment of the photo-electric cell coating. It was hitherto necessary to bring the cell approximately into the vicinity of the point of measurement by feeling, or it was necessary for adjustment to provide the cell with windows.

According to this invention, in order to avoid this difficulty, it is proposed to determine the correct position of the cell in relation to the pictorially important point of the negative to be measured, by positive means. This is done either by arranging the cell on a pivotable arm of such dimensions that when the arm is directed downwards the cell is constrained to come into position over the point to be measured, or by the provision of lines of demarcation on the contact surface which corresponds exactly to the outline of the cell to be placed thereon. In each case the most pictorially important part of the negative is brought to the measuring position.

Another solution consists in illuminating the negative from below with inactinic light which does not act on the cell, in such manner that the illuminated surface is of the same size as the contact surface of the photo-electric cell. Thus it is only necessary to bring the red-illuminated surface into register with the cell. If use be made of lines of demarcation, the entire surface of the negative may be illuminated with red light. Either printing light or a special measuring light is used as source of light. If printing light is used, a curtain, slide or the like with marking or recesses for the measuring position during the measuring operation, must be placed between the source of light and the cell. When a special measuring light is used, it is advantageous for the cell holder to be coupled with the light switch in such a manner that on approaching the cell the course of current to the measuring light is positively closed, but on moving away from the cell the current is positively interrupted or weak closed circuit current is switched on.

The invention will now be described with reference to the accompanying drawing.

If a special measuring light is provided, the entire surface 1, on which the negative 2 is to be placed, is illuminated with red light; only a single point 3 receives direct, unweakened white light. The cell is either mounted on a pivotal arm 6a in such a manner that when the arm is moved downwards the cell comes into position over the measuring position 3, or lines of demarcation or corner members 4 are provided round the point of measurement, said lines or corners corresponding exactly to the outline of the contact surface 5 of the photo-electric cell 6.

For the purpose of measurement the negative 2 is placed on the glass disc or ground glass screen 1, the points which are pictorially most important are sought out, and the negative is moved about until the part which is of most pictorial importance and the bright point of measurement 3 are superimposed. Then the photo-electric cell is placed on the negative and the marked measuring surface 4a is brought into exact register with the cell 5, 6. Thus the point to be measured lies exactly in the middle of the photo-electric cell 6, and, actually, only the brightness of this point is measured by the photo-electric cell.

Instead of the lines of demarcation or the corners 4, it is also possible to illuminate only a part of the measuring surface by red light, so that the red-illuminated surface 4a in Fig. 1 agrees with the surface 5 of the cell 6. For measuring, the red surface is brought into register with the lines.

If the printing light 7 be used as measuring light, before the printing process commences a curtain 8 must be inserted between the negative 2 and the printing light 7, said curtain being provided with a red disc 9, the surface of which corresponds exactly to the basic surface of the cell 6. In the middle of this red surface there is a free opening 10 which illuminates only one point of the negative. Then the negative is moved about until the bright point of measurement coincides with the point in the negative which is of most pictorial importance, the red surface 9 is brought into register with the cell 6, and the measurement is read from the instrument 11. In order that the measuring light shall not burn continuously, it is advantageous if it is switched on automatically only shortly before the measurement. The switch is controlled, for example, by raising the cell of the measuring apparatus from a movable pivoted hook 12, which switches the light on and off positively, by operating after the manner of a telephone receiver. In order to secure a uniform illumination a ground glass pane 13 is arranged between the source of light 7 and the curtain 8.

What I claim is:

1. In an apparatus for measuring the printing properties of a negative in combination, a casing, a transparent pane in said casing, a small area marked on said pane, a source of light for illuminating said pane, a casing containing a photo-electric cell, a further marked area on said pane corresponding with the outlines of said casing containing a photo-electric cell, so that when bringing said casing into register with said second marked area, said photo-electric cell is in correct register with said small area.

2. In an apparatus for measuring the printing properties of a negative in combination, a casing, a transparent pane in said casing, a small area marked on said pane, a source of light for illuminating said pane, a casing containing a photo-electric cell, four marked corners on said pane surrounding said small area and marking on said pane an area corresponding in size with said casing containing a photo-electric cell, so that when bringing said casing into register with the area inside said corners, said photo-electric cell is in correct register with said small area.

3. In an apparatus for measuring the printing properties of a negative in combination, a casing, a transparent pane in said casing, a small area marked on said pane, a source of light for illuminating said pane, a casing containing a photo-electric cell, a red area corresponding in size with said casing and arranged around said small area, so that when bringing said casing into register with said red area, said photo-electric cell is in correct register with said small area.

KARL HUBER.